Figure 1:
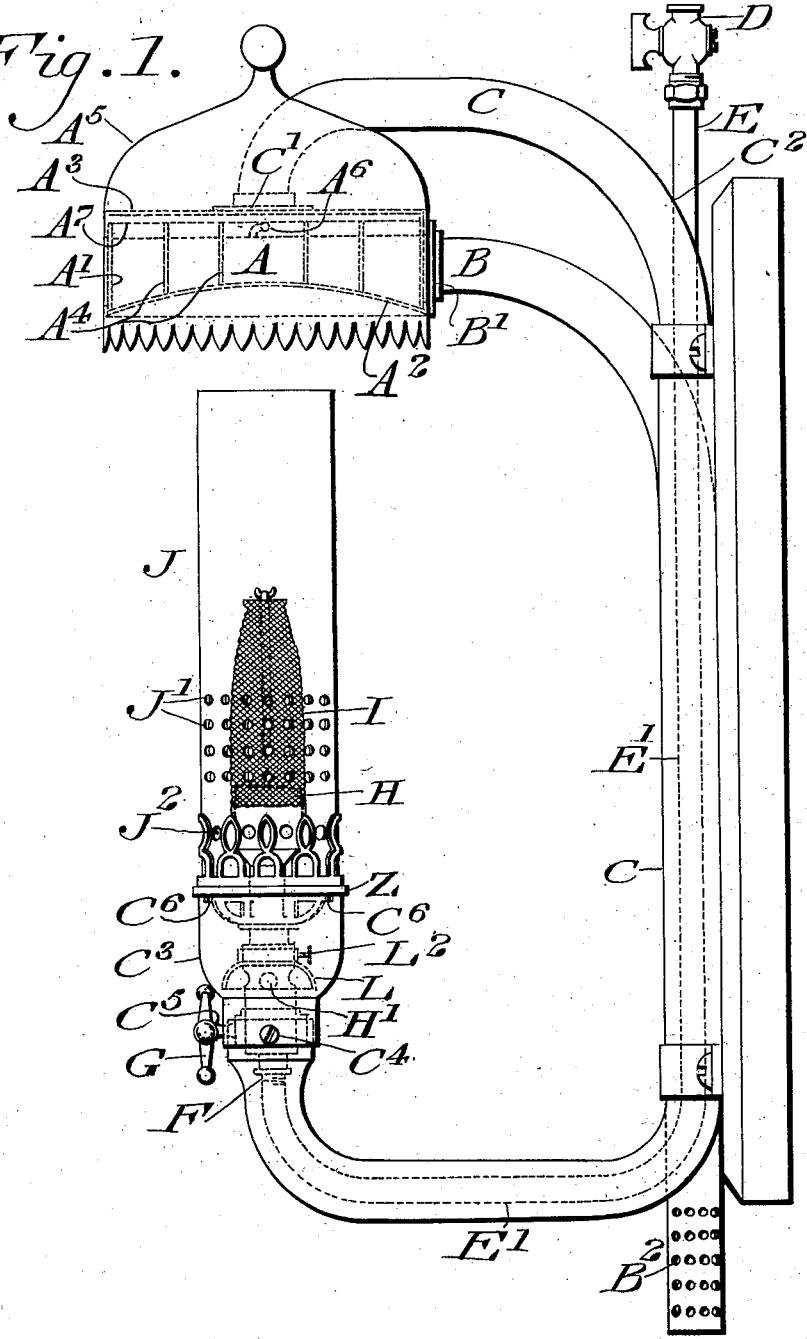

No. 747,805. PATENTED DEC. 22, 1903.
J. TOLSON.
INCANDESCENT MANTLE LIGHTING APPARATUS.
APPLICATION FILED MAY 12, 1903.
NO MODEL. 3 SHEETS—SHEET 1.

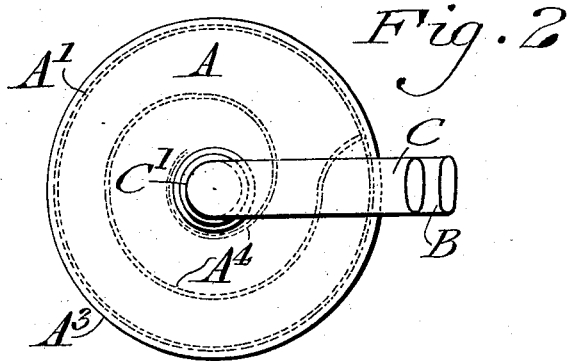
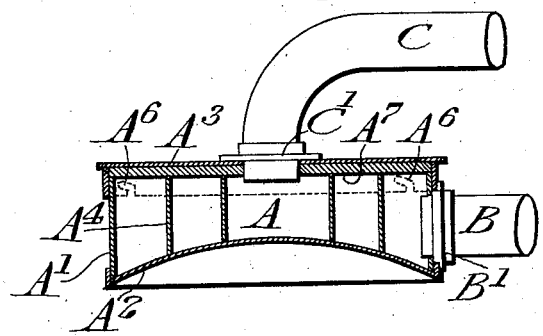
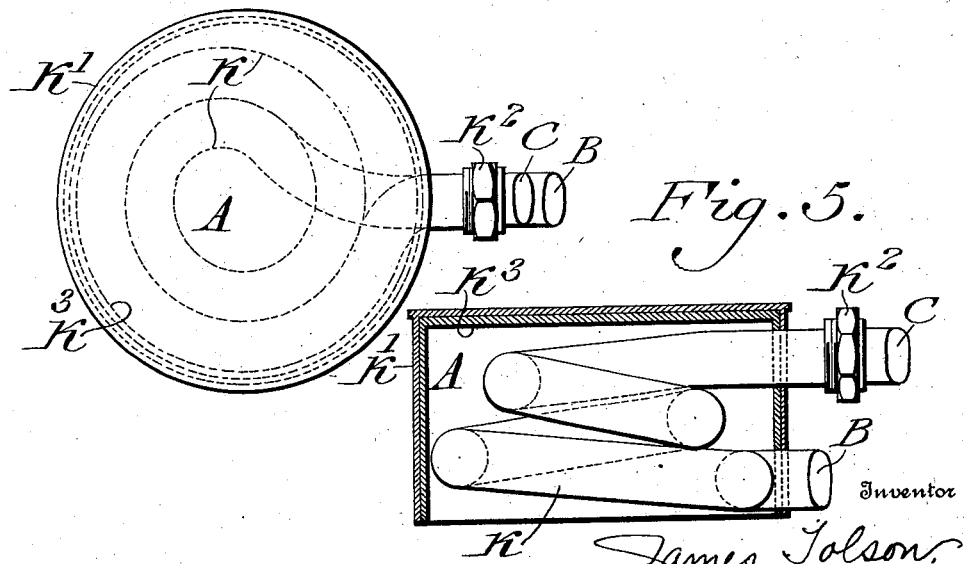

No. 747,805. PATENTED DEC. 22, 1903.
J. TOLSON.
INCANDESCENT MANTLE LIGHTING APPARATUS.
APPLICATION FILED MAY 12, 1903.
NO MODEL. 3 SHEETS—SHEET 3.
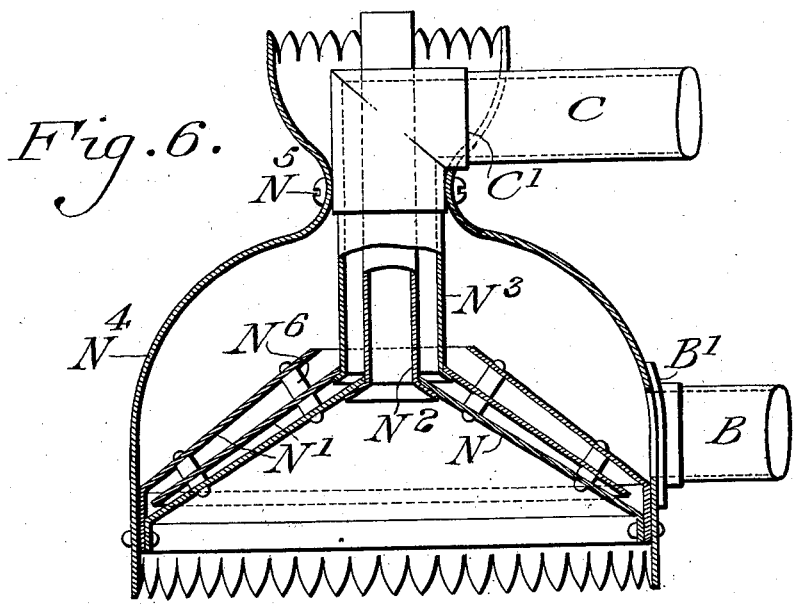
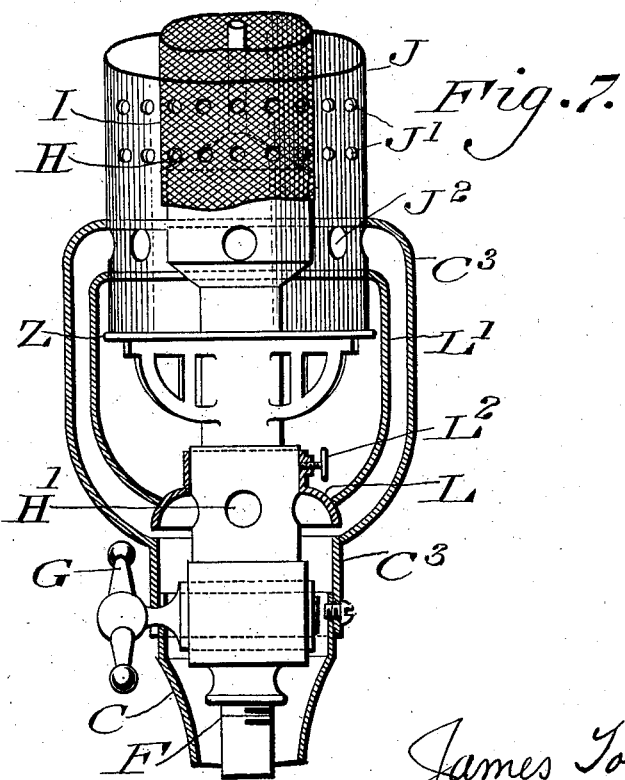
Witnesses
Inventor
James Tolson.
By Wiedersheim & Fairbanks,
Attorneys No. 747,805. Patented December 22, 1903.

UNITED STATES PATENT OFFICE.

JAMES TOLSON, OF ESPLANADE, SANDGATE, QUEENSLAND, AUSTRALIA.

INCANDESCENT-MANTLE-LIGHTING APPARATUS.

SPECIFICATION forming part of Letters Patent No. 747,805, dated December 22, 1903.

Application filed May 12, 1903. Serial No. 156,823. (No model.)

*To all whom it may concern:*

Be it known that I, JAMES TOLSON, a citizen of Victoria, residing at Esplanade, Sandgate, in the State of Queensland, Australia, have invented a new and useful Improvement in Incandescent-Mantle-Lighting Apparatus, of which the following is a specification.

In the present system of incandescent-mantle lighting a considerable portion of the energy liberated in the act of combustion of the illuminant is lost so far as its application to the incandescent mantle is concerned. Also it is probable that the chemical union of a portion of the partially-burned or wholly-unburned particles of the illuminant with the oxygen of the air does not take place at all or takes place at such a distance from the surface of the mantle as to be practically useless for the purpose of incandescence.

The object of my invention is, first, to render the combustion of the illuminant as complete as possible at or near the surface of the mantle, thereby increasing the brilliancy of the incandescence, and, secondly, to impart a portion of the waste energy contained in the consumed gases or products to the incoming air and illuminant, thereby reducing the quantity of the illuminant used as compared with that at present required. To accomplish this end, I cause the entering air and gas or vapor, or both of them, to circulate through pipes or over surfaces so arranged as to absorb the waste heat from the products of combustion issuing from the chimney.

My invention consists of a novel arrangement whereby the heat liberated or generated by the combustion of the illuminant is utilized as far as possible in imparting increased thermal energy to the air and illuminant about to be consumed, thereby rendering them more fully available for the production of light at a reduced cost.

I am aware that many regenerative lamps have been designed to apply hot air and fuel for flame-lamps, and my invention applies similar means to the incandescent-mantle lamps.

My invention also consists of a novel perforated chimney capable of admitting currents of air to its interior. By this means the incombustible constituents of the air that issue through the mantle and the partially-consumed gases or vapors and the products of combustion that are formed within the mantle and that also issue through the mantle, all of which tend to form a more or less obstructing layer to further combustion, are broken up and mixed with the unburned air. This breaking up or mixing of any unburned or partially-burned particles of gas or vapor and air allows of their combining more rapidly and readily at or near the surface of the mantle with the oxygen supplied from below or with that supplied through the perforations in the chimney, or both, thereby increasing the incandescence of the mantle.

My invention further consists of a novel arrangement consisting of an illuminant-supply pipe inclosed in an air-supply pipe, whereby the illuminant and all the lower parts of the apparatus are heated by the air to which heat has been imparted from the waste gases issuing from the chimney.

My invention also consists of a novel disk so placed above the inlet-holes, which admit air into the Bunsen burner, that by raising or lowering the said disk a smaller or larger portion of the current of heated air passing through the burner-case is deflected into the Bunsen-burner inlet-holes, and thereby retarding or accelerating its passage into the mantle and also directing the surplus hot air into the chimney at right angles.

Figure 1 represents a general elevation of an improved apparatus for incandescent-mantle lighting. Fig. 2 represents a plan of the helix-box. Fig. 3 represents a sectional elevation of the helix-box. Fig. 4 represents a plan of the helix-coil. Fig. 5 represents a sectional elevation of the helix-coil. Fig. 6 represents a sectional elevation of the heater-cone. Fig. 7 represents a sectional elevation of the air regulating and deflecting disk with an attachment which may embody the principle of the *vena contracta* or the diverging cone for conducting the hot air to the inlet-holes in the base of the chimney.

Similar letters of reference indicate corresponding parts in the figures.

Referring to the drawings, A designates that portion of my new or improved apparatus for incandescent-mantle lighting known as the "heater," comprising $A'$, the helix-box, having a concave bottom $A^2$; $A^3$, the cover of the helix-box, which prevents leakage; $A^4$, the helix, whereby the incoming air is circulated; $A^5$, the ornamental cap; $A^6$, the fastener for the cover, and $A^7$ a non-conducting lining.

B designates the cold-air-supply pipe, which is connected with A at the point $B'$ and having the cold-air inlet at $B^2$.

C designates the hot-air-supply pipe, which is attached to the cover of the helix-box $A^3$ at the point $C'$.

$C^2$ designates the point of entry of the illuminant-supply pipe E into the hot-air pipe C.

$C^3$ designates detachable burner-cases which inclose the space between the hot-air pipe C and the chimney, whereby any inflow of unheated air is prevented.

$C^4$ designates a screw for the purpose of securing $C^3$ to the end of $C'$.

$C^5$ designates an aperture through which the burner-tap protrudes, enabling the same to be adjusted.

$C^6$ designates slots cut in the top of $C^3$ for the purpose of securing the gallery Z.

D designates the gas-supply tap, which cuts off the illuminant from the main supply.

E designates the illuminant-supply pipe, which is connected with the Bunsen-burner apparatus and which enters C at the point $C^2$.

$E'$ designates that portion of the illuminant-supply pipe E, which is surrounded with the hot air contained in the pipe C.

F designates the point of connection of the pipe $E'$ with the Bunsen burner.

G designates the Bunsen-burner-regulating tap.

H designates the Bunsen burner or its equivalent.

$H'$ designates the air-inlets into the Bunsen burner.

I designates the incandescent mantle.

J designates the chimney, in which the perforations marked $J'$ and $J^2$ are shown.

L designates the disk for regulating and deflecting the heated air into the Bunsen-burner air-supply inlets.

$L'$ designates that portion of the attachment to the disk which may be made in the form of a *vena contracta* or a diverging cone, whereby the hot air is directed into J through the perforations $J^2$ at right angles, as shown in Fig. 7.

$L^2$ designates a binding-screw for the same.

K designates a helical coil, as shown in Figs. 4 and 5, whereby the air to be consumed is circulated and heated.

$K'$ designates the helical-coil cover to prevent loss of heat.

$K^2$ designates air-pipe unions.

$K^3$ designates a non-conducting lining.

N designates a heater-cone, as shown in Fig. 6, comprising $N'$, an inner cone or cones, whereby the incoming air is circulated.

$N^2$ designates an internal waste-air uptake-pipe.

$N^3$ designates the external hot-air pipe.

$N^4$ designates the cover.

$N^5$ designates the air-tight attachment.

$N^6$ designates distance-pieces between the cones.

Z designates the gallery for supporting the chimney.

It will be apparent from the foregoing that cold air entering at $B^2$, passing through B, and entering A or its equivalent K or N at the point $B'$ must circulate through $A^4$ or its equivalent K or N and will issue into C at the point $C'$. As A is absorbing heat from the gases issuing from the chimney J it will be readily seen that the air passing as above described must become intensely heated. The hot air now in C on arriving at the point $C^2$ envelops the illuminant-pipe E and during its course to H heats the illuminant contained therein. Heated air and the illuminant then enter the mantle through the burner in the usual manner, and a portion of the heated air passes up to and envelops the exterior of the mantle.

It is to be understood that while I have shown the illuminant-supply pipe E as entering the hot-air-supply pipe C at the point $C^2$ I do not desire to be limited to that particular point, and I may have the entrance at any point nearer or farther away from the burner H, or I may have the illuminant-supply pipe entering the cold-air-supply pipe B and inclosed in A or its equivalent K or N. It is also to be understood that while I have shown the perforations in the chimney as being circular and placed in rows I desire to reserve the right to have them of any shape or size and in any number or position above the base. It is also to be understood that while I have shown several forms of heaters I do not desire to be limited thereto, but may have them of any design most suitable for the purpose required. It is also to be understood that while I have shown the disk as being of a concave shape I do not desire to be limited thereto, but may have it either cone-shaped or flat or of any other shape, as may be most suitable for the purpose required.

Having thus described my invention, what I claim as new, and desire to secure by Letters Patent, is—

1. In a new or improved apparatus for incandescent-mantle lighting, a heater in the form of a box, having therein a division in the form of a helix, an air-tight cover with a non-conducting lining therefor and inlet and outlet pipes.

2. In a new or improved apparatus for incandescent-mantle lighting, a heater in the form of a helical-shaped coil of piping, an air-tight cover with a non-conducting lining therefor, and inlet and outlet pipes.

3. In an incandescent lamp, a heater, an imperforate pipe operative to convey heated air therefrom to the burner and an imperforate illuminant-supply pipe entering said air-pipe and passing therethrough.

4. In an incandescent lamp, a heater, an imperforate pipe operative to convey heated air therefrom to the burner and an imperforate illuminant-supply pipe entering said air-pipe and continuing therethrough to the burner.

5. In an incandescent lamp, a heater, a passage for conveying heated air therefrom, an imperforate shell at the exit end of said passage and a chimney-gallery on said shell.

6. In an incandescent lamp, a heater, a passage for conveying heated air therefrom, an imperforate shell at the exit end of said passage, a mixing-chamber in said shell and a chimney-gallery mounted on said shell.

7. In an incandescent lamp, a heater, a passage for conveying heated air therefrom, an imperforate shell at the exit end of said passage, means for regulating the volume of heated air admitted to said shell and a chimney-gallery mounted on said shell.

8. In an incandescent lamp, a heater, a passage for conveying heated air therefrom, an imperforate shell at the exit end of said passage, an adjustable regulating and deflecting disk in said shell and a chimney-gallery mounted on said shell.

9. In an incandescent lamp, a chimney having an aperture in its wall and positive means for directing a current of air through said aperture.

10. In an incandescent lamp, concentric shells having chimney-receiving openings therethrough, a chimney having an aperture in its wall adjacent the annular space between said shells, a heater and means for conveying heated air to said annular space.

11. In an incandescent lamp, concentric shells having inturned flanges at their upper end with chimney-receiving openings therethrough, means for conveying heated air to the annular space between said shells in combination with a chimney adapted to enter and to substantially fill said openings and having an aperture in its wall communicating with the space between said flanges.

12. In an incandescent lamp, concentric shells having chimney-receiving openings therethrough, a chimney having an aperture in its wall adjacent the annular space between said shells, a heater, means for conveying air from said heater to said annular space and means for regulating the amount of heated air conveyed to said annular space.

13. In an incandescent lamp, concentric shells having inturned flanges at their upper ends with chimney-receiving openings therethrough, adjustable means for conveying heated air to the annular space between said shells in combination with a chimney adapted to enter and to substantially fill said openings and having an aperture in its wall communicating with the space between said flanges.

14. In an incandescent lamp, concentric shells having chimney-receiving openings therethrough, a passage for conveying heated air to the annular space between said shells and a regulating and deflecting disk for controlling the volume of heated air supplied to such annular space.

JAMES TOLSON.

Witnesses:
V. P. BRETT,
J. H. WILMOT.